United States Patent [19]

Raus

[11] 4,026,397

[45] May 31, 1977

[54] CONTROL KNOB CLUTCHES WITH LOCK

[75] Inventor: Robert W. Raus, Fairport, N.Y.

[73] Assignee: Xerox Corporation, Stamford, Conn.

[22] Filed: Oct. 6, 1975

[21] Appl. No.: 619,759

[52] U.S. Cl. .............................. 192/48.1; 192/95; 192/114 R; 74/554

[51] Int. Cl.² ........................................ F16D 11/04

[58] Field of Search .............. 74/548, 554; 192/95, 192/48.1, 114 R, 34

[56] References Cited

UNITED STATES PATENTS

| | | | |
|---|---|---|---|
| 2,727,406 | 12/1955 | Opocensky | 192/114 X |
| 2,753,736 | 7/1956 | Mitchell | 192/95 X |
| 2,937,535 | 5/1960 | Wezner | 192/114 X |

Primary Examiner—Benjamin W. Wyche

[57] ABSTRACT

A control knob for permitting the service technician to adjust the operating level of a component in an electrostatic type reproduction machine with locking means effective to prevent unauthorized adjustments by others. To enable the machine user or operator, when training and experience warrants it, to perform service adjustments, the control knob incorporates an internal release mechanism, settable only by the machine service technician, permitting selected adjustment by the operator despite the locking means.

7 Claims, 7 Drawing Figures

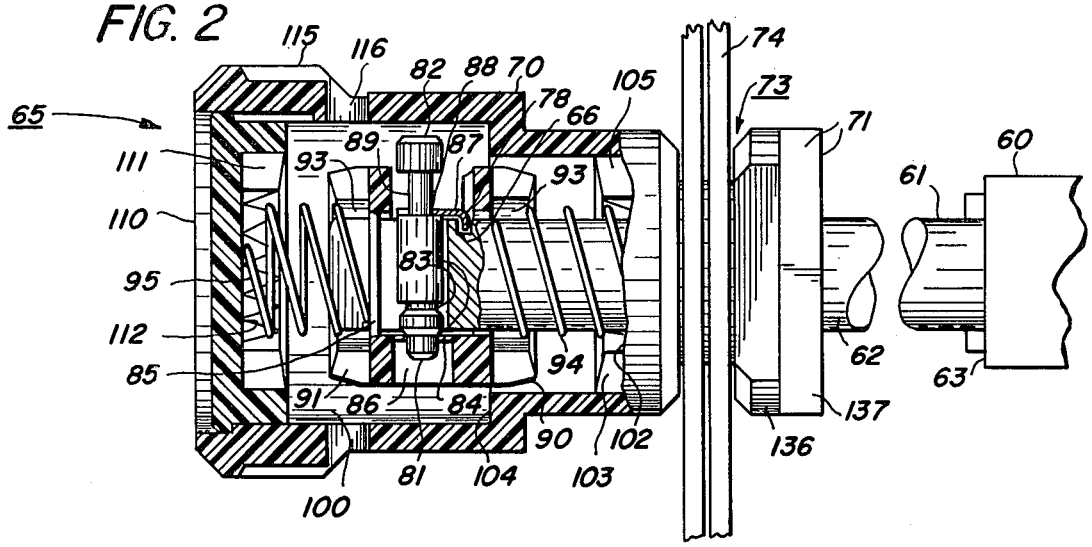
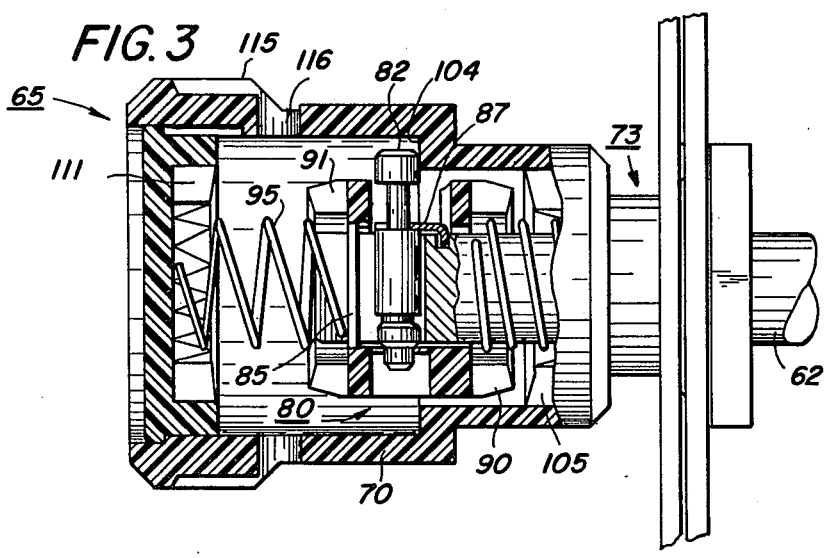
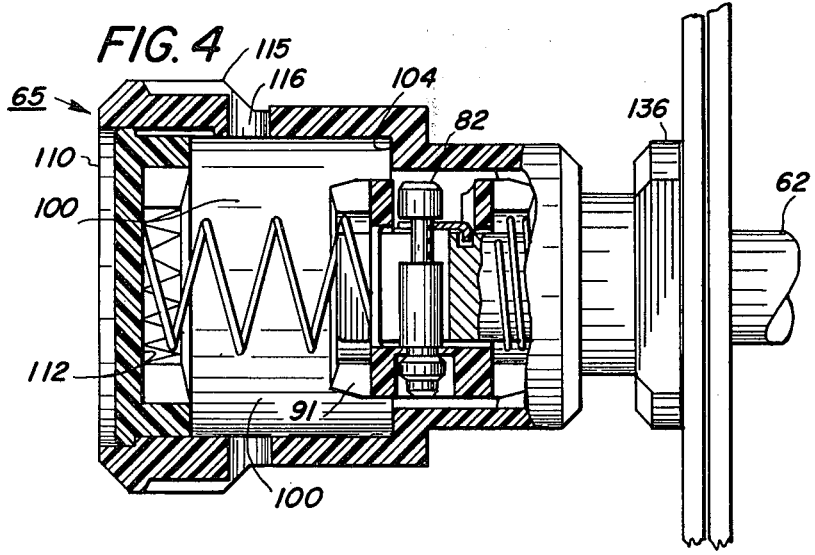

CONTROL KNOB CLUTCHES WITH LOCK

This invention relates to electrostatic type reproduction machines, and more particularly to an improved control for servicing such machines.

High speed copiers and duplicators are relatively complex machines, and normally include a variety of controls accessible to the trained and highly skilled service technican for adjusting and optimizing machine performance. These may include voltage and current adjustments to various operating components dependent upon such voltage and current inputs for effective operation.

Since adjustments to the machine operating components are both critical and often interrelated, it is normally desired that such adjustments be reserved for the trained technican and that others be precluded from making such adjustments. At the same time, it is recognized that a dedicated machine user or operator may, with sufficient experience and instruction, be capable of making certain adjustments herself without the need to call upon and wait for the grained technican. Notwithstanding, protection against unauthorized adjustments by others is still necessary, and even against over adjustment by the dedicated operator.

It is therefore a principal object of the present invention to provide a new and improved electrostatic type reproduction machine.

It is a further object of the present invention to provide improved apparatus for servicing copiers.

It is an object of the present invention to provide an improved control for adjusting the operating components of a reproduction machine.

It is an object of the present invention to provide a control for adjusting one or more of the operating components of a copier which can be locked in a non-operative position when not in use.

It is an object of the present invention to provide an improved control knob for use in servicing an electrostatic reproduction machine incorporating means settable the option of the service technican to enable the relatively untrained operator to perform service adjustments.

It is an object of the present invention to provide a control knob lockable to prevent unauthorized use, but with means to optionally permit restricted use of such knob even while locked.

This invention relates to an electrostatic type reproduction machine, the combination comprising, at least one machine operating component having a control element for making adjustments to the machine component; an internal clutch collar drivingly coupled to the control element, the collar having a pair of discrete clutching surfaces; an exterior control sleeve a pair of clutching surfaces, for selectively engaging one or the other of the collar clutching surfaces to provide first and second clutches for coupling the sleeve through the clutch collar with the control element means supporting the control sleeve for movement relative to the clutch collar for engaging one or the other of the first and second clutches selectively; and locking means actuable to restrain relative movement between the sleeve and the clutch collar and prevent engatement of either of the first and second clutches.

Other objects will be apparent from the ensuing description and drawings in which:

FIG. 2 is a side view in cross section showing the control knob of the present invention in a locked state;

FIG. 3 is a side view in cross-section showing the control knob pulled with the stop raised to prevent engagement of the drive clutch;

FIG. 4 is a side view in cross-section showing the control knob pulled with the stop depressed to permit engagement of the drive clutch;

Figure 1:
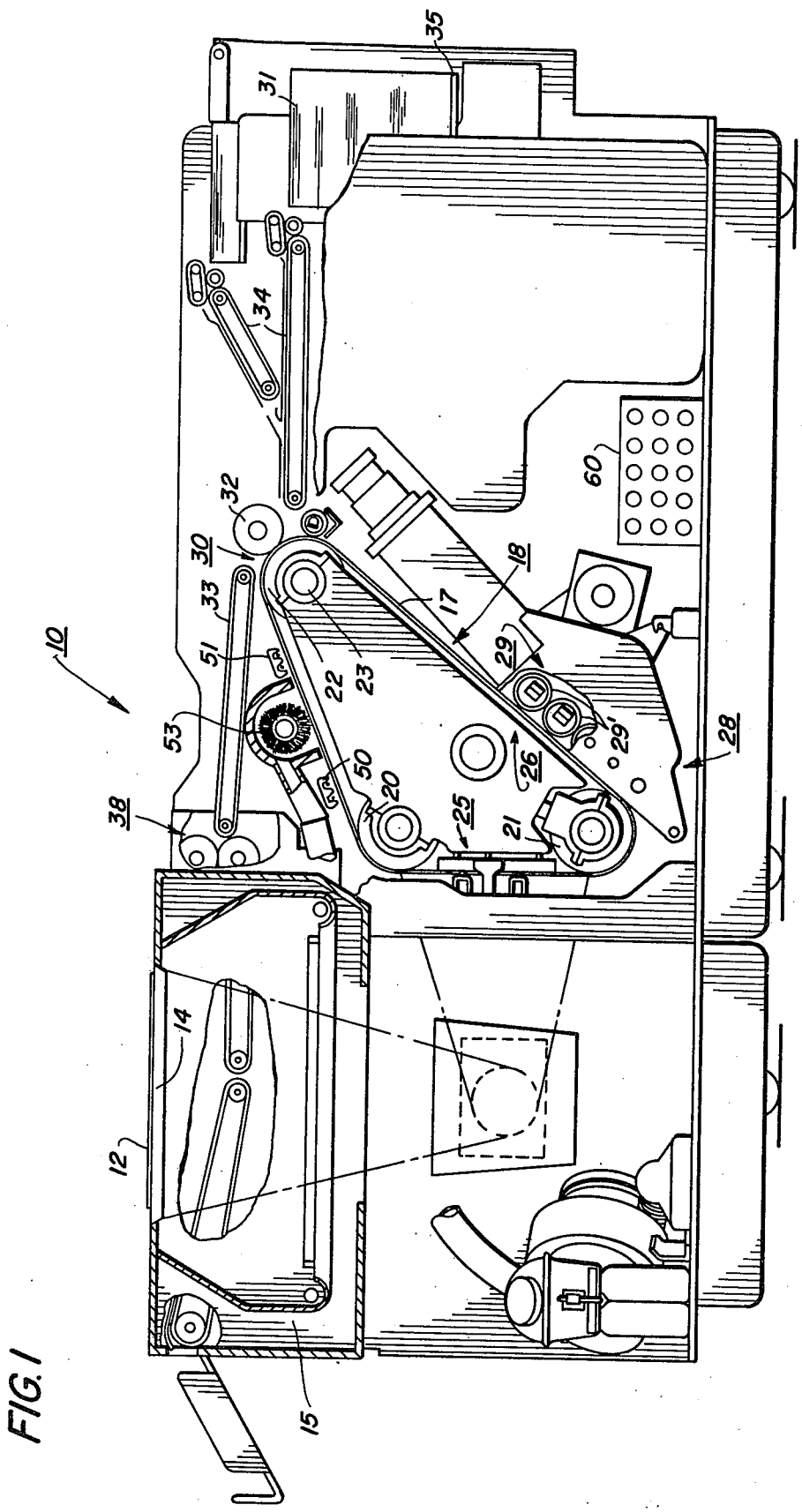
FIG. 1 is a schematic view of an exemplary electrostatic reproduction machine incorporating the control knob of the present invention.
Figure 5:
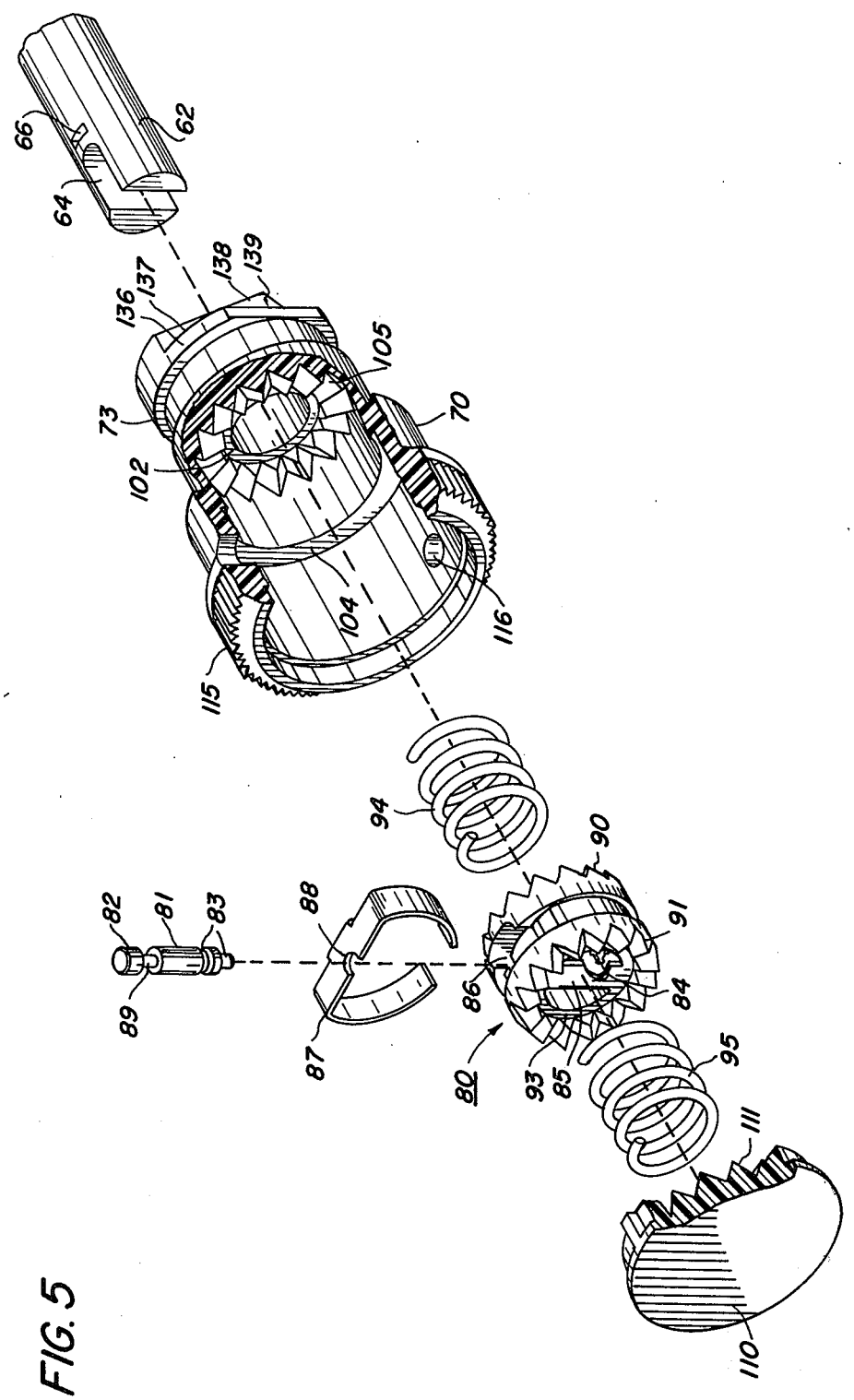
FIG. 5 is an exploded view showing the component parts of the control knob.

Referring particularly to FIG. 1 of the drawings, an exemplary copier/reproduction machine designated generally by the numeral 10 and incorporating the control arrangement of the present invention is there shown. As in all electrostatic systems such as the xerographic type machine illustrated, a light image of a document to be reproduced is projected onto the sensitized surface of a xerographic plate to form an electrostatic latent image thereon. Thereafter, the latent image is developed with an oppositely charged developing material to form a xerographic powder or toner image, corresponding to the latent image on the plate surface. The toner image is then electrostatically transferred to a support surface where it is fused by a fusing device so that the toner image is permanently adhered to the support surface.

In machine 10, an original document 12 to be copied is placed upon a transparent support platen 14 fixedly arranged in an illumination assembly generally indicated by the reference numeral 15 and disposed at the left end of the machine. While upon the platen, the document 12 is illuminated, thereby producing image rays corresponding to the informational areas on the original. The image rays are projected by means of an optical system onto the photosensitive surface of a xerographic plate. In the exemplary copier/reproduction machine 10, the xerographic plate is in the form of a flexible photoconductive belt 17 supported in a belt assembly 18.

The support assembly 18 for photoconductive belt 17 includes three rollers 20, 21 and 22 located with parallel axes at approximately the apices of a triangle. The upper roller 22 is rotatably supported on shaft 23 which in turn is rotatably driven by a suitable motor and drive means (not shown) to drive belt 17 in the direction shown by the arrow in FIG. 1. During this movement of the belt, the reflected light image of the original document 12 on platen 14 is flashed upon the photoreceptor surface of belt 17 at an exposure station 25 to produce an electrostatic latent image thereon.

The continued movement of photoconductive belt 17 carries the electrostatic image through a developing station 26 in which there is positioned a developer assembly generally indicated by the reference numeral 28. There the latent electrostatic image is developed by means of toner through the use of a multiple magnetic brush system 29.

The developed electrostatic image is carried by belt 17 to the transfer station 30 where the developed image is transferred to a support surface, normally a sheet of copy paper 31, brought forward between transfer roller 32 and belt 17. To accomplish transfer of the developed image, an electrical bias is applied to transfer roller 32. Copy sheet 31 is moved at substantially the same speed as belt 17. A sheet transport mechanism generally indicated at 34 is provided to advance copy sheets 31 from a paper handling mechanism generally indicated by the reference numeral 35 to transfer station 30.

Following transfer, the copy sheet 31 is separated from belt 17 and conveyed by transport 33 to fuser 38 wherein the toner image is permanently fixed or affixed thereto. Following fusing, the finished copy may be discharged directly to a copy collecting device such as an output tray or sorter (not shown).

Photoconductive belt 17 comprises a photoconductive layer of selenium, which is the light receiving surface and imaging medium for the apparatus on a conductive backing. Further details regarding the structure of the belt assembly 12 and its relationship with the machine and support therefor may be found in U.S. Pat. No. 3,730,623, issued May 1, 1973.

Reproduction machine 10 includes a suitable corona discharge device, i.e. corotron 50 for uniformly charging photoconductive belt 17 preparatory to exposure thereof at imaging station 25. A second corona discharge device, preclean corotron 51 is provided upstream of belt cleaning brush 53 to facilitate removal of leftover developing materials therefrom. A suitable source of electrical energy (not shown) is provided for corotrons 50, 51.

The enhance development of the latent electrostatic images produced on belt 17 by magnetic brushes 29, suitable electrical bias may be applied to the exterior sleeves 29' of brushes 29. To enhance transfer of the developed image from belt 17 to copy sheet 31 at transfer station 30, a suitable electrical bias may be applied to transfer roller 32. A suitable source of electrical bias is provided for magnetic brushes 29 and transfer roller 32.

In addition to the machine components described above, various other operating components, i.e., automatic developability controls, may utilize electrical power and energy to enhance operation thereof. As will be understood by those skilled in the art, the power and bias settings of the various operating components such as corotrons 50, 51 and magnetic brushes 29 may be critical to the attaining of optimized machine operation.

To enable operation of reproduction machine 10 to be optimized, some or all of the machine operating components made adjustable to permit the settings thereof to be changed from time to time during the service life of reproduction machine 10. While adjustments in the settings of the various operating components must normally be made by a highly trained service technican rather than the machine operator, or user. It can be understood that skilled operators may, in some cases be relied upon to make at least limited adjustments in the settings of some or all of the machine operating components.

Referring now to FIG. 2 of the drawings, an exemplary source of power designated by the numeral 60 is there shown. For purposes of explanation, power source 60 is presumed to be the source of electrical bias to magnetic brushes 29 although it will be understood that power souce 60 may provide electrical energy to various other machine components as well. Bias adjusting shaft 61 projects from side 63 of power source 60, shaft 61 serving to regulate the bias applied to magnetic brushes 29. To permit limited or restricted access to shaft 61, a lockable control knob 65 is provided. As will appear, control knob 65, under certain conditions, permits either free or restricted rotation of shaft 61 and adjustment of the bias output of power source 60 depending on the condition of the locking means.

Control knob 65 comprises a generally cylindrical outer sleeve 70 slidably and rotatably received on the projecting terminal end 62 of the bias adjusting shaft 61. For this purpose, the interior dimension of the inside end 71 of sleeve 70 within which the shaft end 62 is received, is slightly larger than the outer dimension of the shaft end. The outer periphery of sleeve 70 is slotted at 73 for cooperation with locking plate 74 as will appear more fully hereinbelow.

A cylindrical clutch collar 80 is non-rotatably mounted on the terminal end 62 of bias adjusting shaft 61 by means of pin 81 and interior web 85. Pin 81 acts as a guide for the trailing web 85 on insertion of clutch collar 80 onto the end 62 of shaft 61, the shaft terminal end 62 being slotted at 64 for receipt of pin 81 and web 85 therewithin. Clutch collar 80 is provided with a hole 86 for receipt of pin 81, the axis of hole 86 paralleling the axis of internal web 85. As will appear, head portion 82 of pin 81 also functions as a stop with pin 81 being arranged for limited displacement in an axial direction to move stop 82 to an inoperative position. For this purpose, pin 81 is recessed at 83 adjacent one end, recesses 83 cooperting with spring elements 84 integrel with collar 80 to form a spring detent designed to retain pin 81 in either a raised position (the position of FIG. 3) or a depressed position (the position of FIG. 4).

To prevent movement of clutch collar 80 in a longitudinal direction and retain pin 81 in collar 80, a spring retainer 87 is provided. Retainer 87 is provided with a depending prong 78 adapted when clutch collar 80 is fully seated on adjusting shaft 61, to enter slot-like recess 66 in the exterior of shaft 61. Notch 88 in retainer 87 cooperates with reduced diameter area 89 of pin 81 to limit axial movement of pin 81 to a preset amount. It is understood that the degree of axial movement allowed pin 81 by retainer 87 is sufficient to accommodate movement of pin 81 between a raised position (shown in FIG. 3) or depressed position (shown in FIG. 4).

To release retainer 87 when it is desired to withdraw clutch collar 80 from adjusting shaft 61, pin 81 is raised upwardly against the bias imposed by retainer 87 to lift prong 78 of retainer 87 from recess 66 of shaft 61. With prong 78 released, collar 80 may be withdrawn from the terminal end 62 of adjusting shaft 61, web 85 and pin 81 sliding within slot 64 of shaft 61. To prevent lost motion and free play between collar 80 and adjusting shaft 61, the relative dimensions of web 61, the relative dimensions of web 85 and slot 66 are such that web 85 fits snugly within slot 66 of shaft 61.

Clutch collar 80 has clutch faces in the form of beveled gear teeth 90, 91 formed on each end thereof. The end portions of collar 80 are recessed at 93 to accommodate sleeve locating springs 94, 95.

The interior 100 of sleeve 70 is of sufficient diameter to accommodate clutch collar 80 and axial movement of pin 81 between pin raised and lowered positions. The interior dimension of sleeve 70 is progressively stepped at 102, 103 and 104 to form, respectively a locating recess for spring 94, a clutch face in the form of gear teeth 105 matable with gear teeth 90 of clutch collar 80, and a stop abutment cooperable with head 82 of pin 81 to restrict axial motion of sleeve 70 as will appear. See FIG. 3.

A cylindrical end cap 110 having an interior clutch surface in the form of beveled gear teeth 111, matable with gear teeth 91 of clutch collar 80 as will appear, is suitably attached to the open end of sleeve 70 to close the sleeve end. A locating recess 112 in cap 110 serves to receive and locate spring 95.

A portion 115 of the exterior surface of sleeve 70 may be knurled to facilitate grasping thereof by the user. An access hole 116 is provided in sleeve 70 for pin 81, the position of access hole 116 being such that in the normal position of sleeve 70 (shown in FIG. 2), pin 81 is inaccessible.

Figure 6:
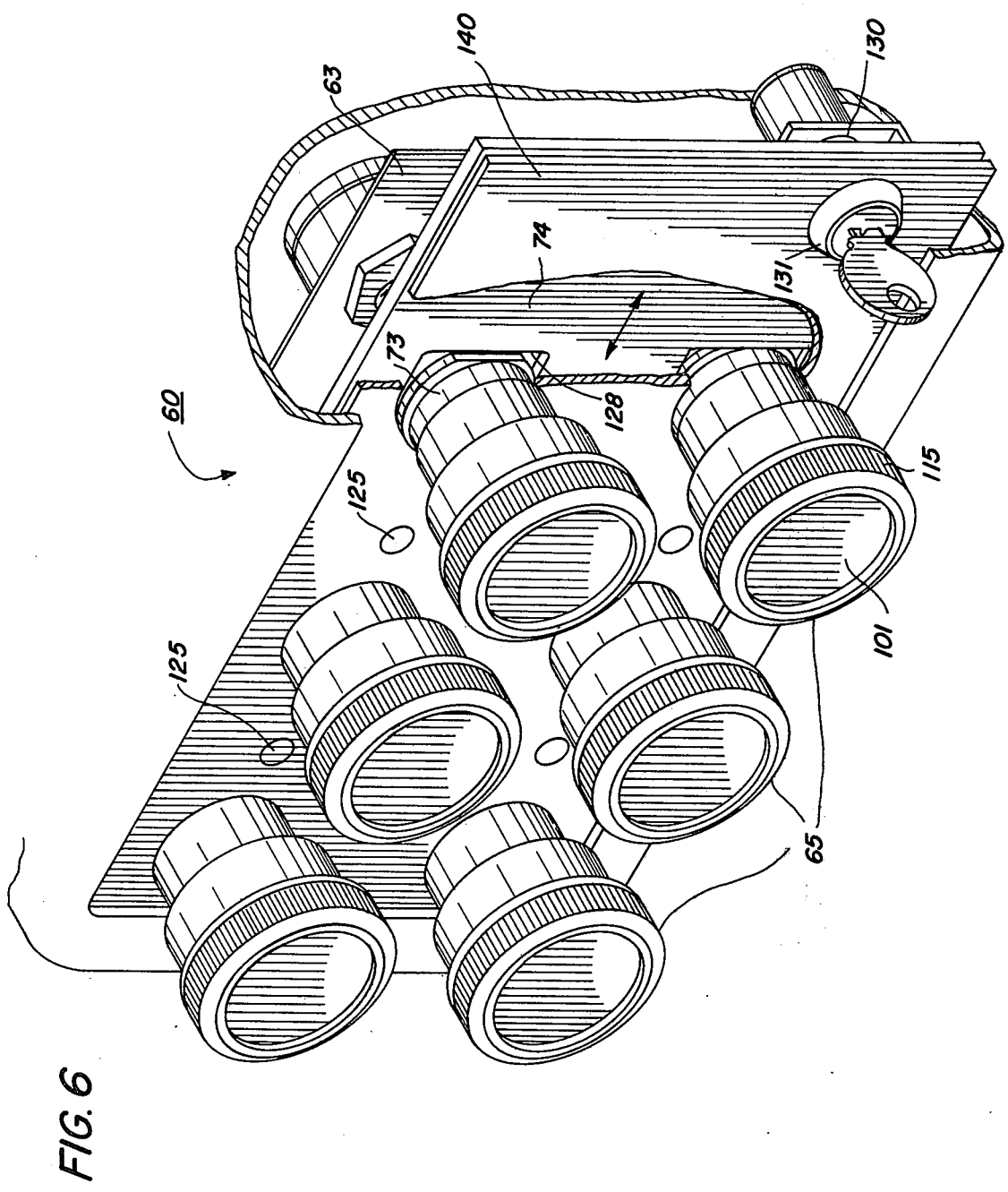
FIG. 6 is an isometric view illustrating the locking plate details.
Figure 7:
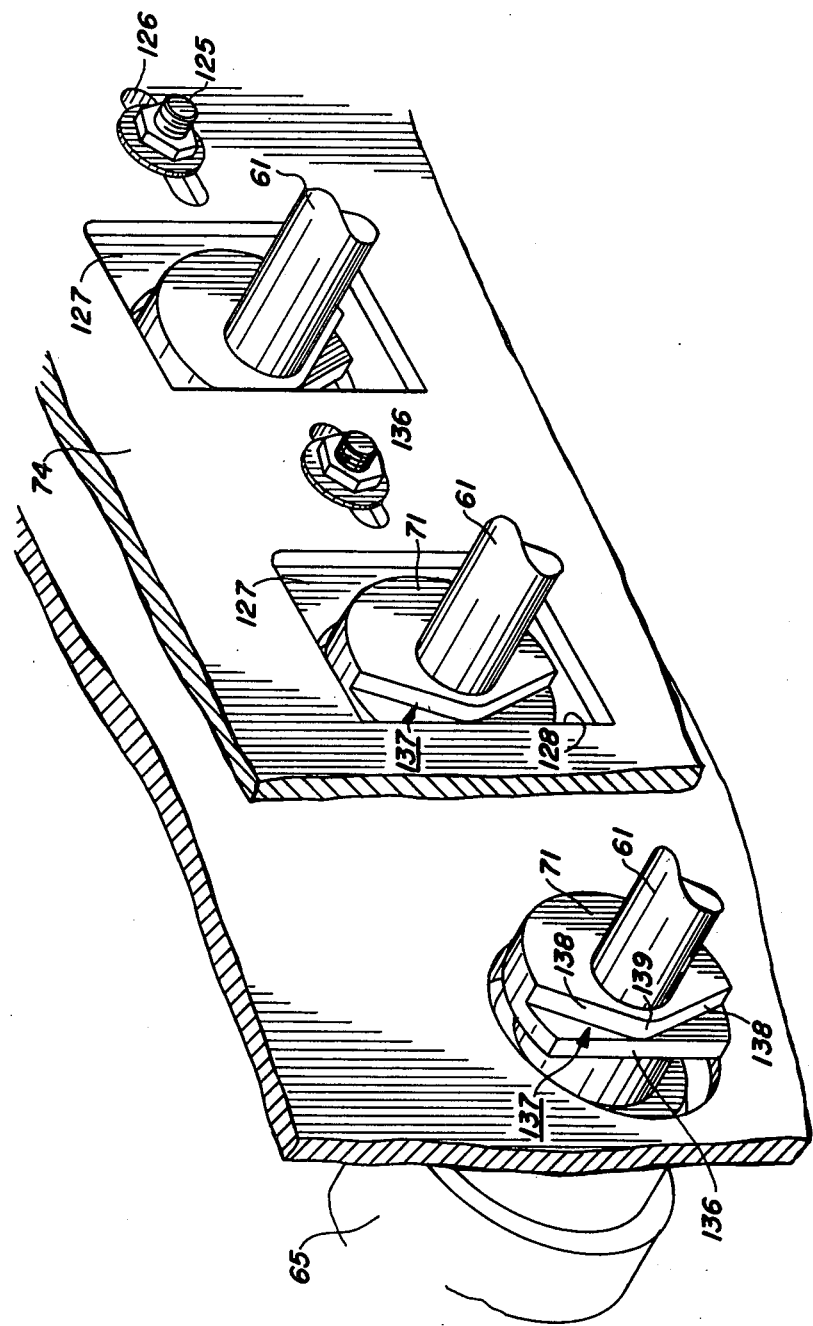
FIG. 7 is an isometric view showing the locking plate and the relationship thereof to the control knob in various operating dispositions.

Referring particularly to FIGS. 6 and 7 locking plate 74, which cooperates with recess 73 in the periphery of the control knob sleeve 70 to prevent or restrict operation of control knob 70 as will appear, comprise a generally rectangular plate-like part supported for sliding motion by cooperating pin 125 and slot 126 means. Pins 125 which may conveniently comprise screw elements 125 are carried on an underlaying frame member 140 while slots 126 are provided in locking plate 74.

Plate 74 is apertured at 127 to accommodate control knob 65 it being understood that the number of apertures 127 in plate 74 and the aperture position correspond to the number and position of control knobs 65 in a multiple control knob arrangement. Aperture 127 in plate 74 comprises a rectangular shaped opening with side 128. The dimension of aperture 127 is slightly larger than the outside diameter of sleeve end 71 to permit control knob 65 to be reciprocated back and forth freely on displacement of plate 74 to the unlocked position.

A suitable lock which may comprise an eccentric driver 130 with key lock 131 is provided to restrict displacement of locking plate 74 and use of control knob 65 by authorized persons.

Peripheral recess 73 in control knob sleeve 70 is relatively wide. Sleeve end 71 has a D-shaped section 136 and a triangular shaped section 137, the latter being comprised of two flat surfaces 138 intersecting at apex 139. When disposed within aperture 127 of locking plate 74, triangular section 137 permits limited rotation of control knob 65 through a predetermined arc as determined by the configuration of section 137.

In use, where adjustment of the machine operating component represented by shaft 61 is restricted to the trained service technican, control knob 65 is locked against operation through the interengagement of locking plate 74 with recessed section 73. In this disposition, locking plate 74 is disposed so that one side 128 of aperture 127 projects into recess 73. This prevents sleeve 70 of control knob 65 from being moved axially, either through pushing or pulling of the control knob a distance sufficient to engage gear set 90, 105 or gear set 91, 111. Thus, while control knob 65 can be freely rotated, no rotation will be imparted to the bias adjusting shaft 61.

While the control knob sleeve 70 might, due to the presence of adjoining recess sections 136, 137 otherwise be or pulled outwardly in a direction which would ordinarily bring gear set 90, 105 into meshing engagement, interengagement of the projecting head 82 of pin 81 with internal stop 104 on sleeve 70 inhibits the degree of sleeve movement to a point where meshing of gear set 90, 115 cannot be obtained. This is shown in See FIG. 3.

When the machine service technican wishes to adjust the setting of the bias power supply 60, lock 131 is unlocked by means of a key in the technican's possession. With lock 131 free, locking plate 74 may be shifted axially to bring the enlarged portion of the aperture or apertures 127 in plate 74 into substantial alignment with the control knob or knobs 65. This permits the control knob sleeve 70 to be depressed against the bias of spring 94 to engage gear set 91, 111. With gear set 91, 111 held in engagement, control knob 65 may be rotated either clockwise or counterclockwise as appropriate to turn the control shaft 61 and adjust the bias level associated therewith. Control knob 65 is then released. When adjustments are completed, locking plate 74 returned to the control knob locking position.

When it is felt that the machine operator is ready to make limited adjustments to one or more of the machine operating components, the service technican may, during a service period when plate 74 is unlocked, align the access hole 116 in control knob sleeve 70 with pin head 82. Then, by means of a driving device, such as an allen wrench, the technican may depress pin 81 to the second detent position formed by the uppermost recess 83 and resilient projections 84. (See FIG. 4) The control knob 65 may then be released and the locking plate 74 returned to the control knob locking position and lock 131 re-locked.

In the event the machine operator wishes to make adjustments, the control knob 65 is turned to bring the flattened portion of the D-shaped section 136 into alignment with the side 128 of aperture 127 in locking plate 74. Knob 65 may then be drawn or pulled outwardly against the bias of spring 95 to engage gear set 90, 105. At the same time, as control knob 65 is pulled out to engage gear set 90, 105, the triangular shaped section 137 of sleeve 70 is brought within aperture 127 in plate 74 opposite side 128 thereof. This disposition of the control knob sleeve 70 restricts the degree of permissable rotation of control knob 65 to the arc defined by the triangulat section 138. Thus while control knob 65 may be drivingly coupled to shaft 61, the arc through which shaft 61 may be turned, and hence the degree of adjustment that may be made to the specific machine operating component associated with the control knob by the operator is limited.

It will be understood that the operator's ability to make adjustments of the type described may be withdrawn by reversing the above procedure and returning the pin 81 to the raised blocking position shown in FIGS. 2 and 3. In this instance, the service technican drives pin 81 from the opposite end.

If during service, the service technican desires to remove control knob 65 from shaft 61, following release of lock 131 and sliding of locking plate 74 to a non-interferring position, control knob 65 in depressed to align aperture 116 in sleeve 70 with pin 81. Pin 81 is then forced outwardly against retainer 87 to disengage prong 78 of retainer 87 from recess 66 in shaft 61. Control knob 65 may then be pulled off of shaft 61.

It will be understood that the service module or modules 60 ordinarily provide servicing for a number or all of the machine operating components, and for this purpose may have a plurality of control shafts 61 projecting therefrom. Those control shafts, the access to which is to be limited, are provided with the cooperating control knob/locking plate 65, 74 arrangement heretofore described while other control shafts not similarly restricted may be provided with conventional knobs or other devices facilitating rotational operation thereof.

It is also understood that, in a multiple component service module 61 such as illustrated, the degree of adjustment allowed the machine operator may vary from control shaft to control shaft. This is done by providing predetermined configurations for cam section 137 tailored to each operating component and may vary from unrestricted rotation of control shaft 61 to extremely limited rotation. In addition, cam sections 137 of different predetermined configurations may be substituted from time to time by the service technican such that for any given control knob, operator access may be progressively increased.

While the invention has been described with reference to the structure disclosed, it is not confined to the details set forth, but is intended to cover such modifications or changes as may come within the scope of the following claims.

What is claimed is:

1. In a reproduction machine having at least one adjustable operating component with a control element operable when rotated to adjust said component, the combination of:
   an internal clutch collar drivingly coupled to said control element, said clutch collar having a pair of discrete clutching surfaces;
   an exterior control sleeve, said sleeve having a pair of clutching surfaces for engagement with one or the other of said collar clutching surfaces whereby to provide first and second clutches for coupling said sleeve through said clutch collar with said control element to permit said component to be adjusted by rotation of said sleeve;
   means supporting said control sleeve for movement relative to said clutch collar for engaging one or the other of said first and second clutches selectively; and
   locking means actuable to restrain relative movement between said control sleeve and said clutch collar and prevent engagement of either of said first and second clutches.

2. The reproduction machine according to claim 1, said control sleeve being supported for movement longitudinally of said clutch collar, said locking means including a stop abuttable with said control sleeve on movement of said sleeve in one direction to prevent engagement of said first clutch, and means supporting said stop for displacement to a second disengaged position whereat movement of said sleeve in said one direction and engagement of said first clutch.

3. The reproduction machine according to claim 2 in which said stop is disposed within said sleeve, said sleeve including means to access said stop upon movement of said sleeve to a predetermined position on said clutch collar, said locking means including a second stop for preventing movement of said sleeve to said predetermined position.

4. The reproduction machine according to claim 3 in which said second stop limits movement of said sleeve in the opposite direction to prevent engagement of said second clutch.

5. The reproduction machine according to claim 2 in which said locking means includes means to limit rotation of said control sleeve shaft and adjusting of said control element upon displacement of said stop to said second position and engagement of said first clutch.

6. The reproduction machine according to claim 2 including retaining means for releasably retaining said clutch collar coupled to said control element, said stop being engageable with said retaining means upon displacement thereof to release said retaining means to permit said clutch collar together with said control sleeve to be disengaged from said control element.

7. Control knob apparatus for adjusting a control shaft, comprising:
   an internal collar, said collar having first and second gear teeth at opposite ends thereof;
   means for non-rotatably securing said collar to said shaft;
   a sleeve having said collar received therewithin, said sleeve being movable axially relative to said collar and having first and second internal gear teeth for mating engagement with said collar first and second gear teeth on movement of said sleeve in one direction or the other, said gear teeth cooperating to form first and second clutches for rotatably coupling said sleeve with said control shaft; and
   an internal lock concealed within said sleeve to prevent movement of said sleeve to engage said first clutch;
   said sleeve including an external locking recess for receipt of an external locking member cooperable therewith to restrict axial movement of said sleeve and prevent accessing of said internal lock or engagement of said second clutch.

* * * * *